US012515859B2

(12) United States Patent
Falzoni et al.

(10) Patent No.: US 12,515,859 B2
(45) Date of Patent: Jan. 6, 2026

(54) CAP FOR CONTAINER

(71) Applicant: SACMI COOPERATIVA MECCANICI IMOLA SOCIETA' COOPERATIVA, Imola (IT)

(72) Inventors: Alessandro Falzoni, Imola (IT); Paolo Vitali, Bologna (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 164 days.

(21) Appl. No.: 18/260,374

(22) PCT Filed: Jan. 11, 2022

(86) PCT No.: PCT/IB2022/050162
§ 371 (c)(1),
(2) Date: Jul. 5, 2023

(87) PCT Pub. No.: WO2022/153163
PCT Pub. Date: Jul. 21, 2022

(65) Prior Publication Data
US 2024/0059465 A1    Feb. 22, 2024

(30) Foreign Application Priority Data
Jan. 12, 2021    (IT) .................. 102021000000461

(51) Int. Cl.
*B65D 41/32*    (2006.01)
*B65D 41/34*    (2006.01)
*B65D 55/16*    (2006.01)

(52) U.S. Cl.
CPC ............. *B65D 55/16* (2013.01); *B65D 41/34* (2013.01); *B65D 2401/30* (2020.05)

(58) Field of Classification Search
CPC .... B65D 55/16; B65D 41/34; B65D 2401/30; B65D 41/3428; B65D 41/32; B65D 47/08; B65D 2251/10
(Continued)

(56) References Cited

U.S. PATENT DOCUMENTS 5,246,125 A * 9/1993 Julian ................ B65D 41/3447
215/252
6,474,491 B1    11/2002 Benoit-Gonin
(Continued)

FOREIGN PATENT DOCUMENTS

KR    100981240    9/2010

OTHER PUBLICATIONS

International Search Report, issued Jul. 4, 2022.

*Primary Examiner* — Gideon R Weinerth
(74) *Attorney, Agent, or Firm* — Chrisman Gallo Tochtrop LLC

(57) ABSTRACT

What is described herein is a closing cap for a container, comprising a lateral wall extending around an axis and a transversal wall positioned at one end of the lateral wall, a separating line being provided on the lateral wall to define a retaining ring, which comprises a retaining portion which extends as far as a free edge of the retaining ring and is configured to internally engage with a locking ring of a neck of the container, and a closing element removably engageable with the neck, so as to open or close the container. The separating line extends between a first end and a second end and is circumferentially interrupted to leave the closing element and the retaining ring joined. An incision line is provided on the lateral wall between the separating line and the free edge. The cap additionally comprises a tab, configured to rest on the neck when the closing element is in an open condition, and a pair of movement bands, that is to say, a first movement band and a second movement band which (Continued)

are defined between the separating line and the incision line and a pair of hinge bands, that is to say, a first hinge band and a second hinge band, which extend from the first movement band and from the second movement band towards the transversal wall, the tab being circumferentially interposed between the first hinge band and the second hinge band.

13 Claims, 4 Drawing Sheets

(58) Field of Classification Search
USPC .................................................. 215/252, 258
See application file for complete search history.

(56) References Cited

U.S. PATENT DOCUMENTS

| | | | | |
|---|---|---|---|---|
| 11,718,450 | B2* | 8/2023 | Berroa García | B65D 41/3428 |
| | | | | 215/243 |
| 11,993,436 | B2* | 5/2024 | Erwin | B65D 1/0246 |
| 12,103,742 | B2* | 10/2024 | Berge | B65D 47/10 |
| 12,103,748 | B2* | 10/2024 | Berroa Garcia | B65D 55/16 |
| 12,179,960 | B2* | 12/2024 | Lohrman | B65D 55/16 |
| 12,214,935 | B2* | 2/2025 | Falzoni | B65D 1/0246 |
| 2011/0114593 | A1* | 5/2011 | Ishii | B65D 41/325 |
| | | | | 215/253 |
| 2012/0024815 | A1* | 2/2012 | Kwon | B65D 41/3409 |
| | | | | 215/272 |
| 2012/0298666 | A1* | 11/2012 | Kwon | B29C 45/44 |
| | | | | 220/268 |
| 2018/0118423 | A1* | 5/2018 | Bois | B65D 47/0809 |
| 2020/0115115 | A1* | 4/2020 | Migas | B65D 55/16 |
| 2020/0207525 | A1 | 7/2020 | Sung | |
| 2020/0369446 | A1* | 11/2020 | Mélan-Moutet | B65D 41/3447 |
| 2020/0399036 | A1* | 12/2020 | Dai | B65D 41/325 |
| 2021/0094733 | A1* | 4/2021 | Bloom | B65D 41/3442 |
| 2021/0221572 | A1* | 7/2021 | Migas | B65D 41/3428 |
| 2021/0300648 | A1* | 9/2021 | Bassi | B65D 41/3428 |
| 2022/0002021 | A1* | 1/2022 | Krautkramer | B65D 41/3428 |
| 2022/0055804 | A1* | 2/2022 | Khattar | B65D 41/3428 |
| 2022/0073238 | A1* | 3/2022 | Naumann | B65D 55/16 |
| 2022/0106081 | A1* | 4/2022 | Falzoni | B65D 41/3428 |
| 2022/0185554 | A1* | 6/2022 | Falzoni | B65D 41/3447 |
| 2022/0194673 | A1* | 6/2022 | Erwin | B65D 55/16 |
| 2022/0204228 | A1* | 6/2022 | Bassi | B26D 1/0006 |
| 2022/0204229 | A1* | 6/2022 | Bassi | B65D 41/325 |
| 2022/0267052 | A1* | 8/2022 | Dreyer | B65D 41/3447 |
| 2022/0297896 | A1* | 9/2022 | Zuffa | B29C 43/361 |
| 2022/0315290 | A1* | 10/2022 | Falzoni | B65D 41/3447 |
| 2022/0340340 | A1* | 10/2022 | Bassi | B65D 41/3428 |
| 2022/0355988 | A1* | 11/2022 | Falzoni | B65D 41/3428 |
| 2022/0371795 | A1* | 11/2022 | Naumann | B65D 41/3423 |
| 2023/0098984 | A1* | 3/2023 | Nakamura | B65D 55/16 |
| | | | | 215/252 |
| 2023/0322457 | A1* | 10/2023 | Bassi | B26D 3/08 |
| | | | | 215/243 |
| 2023/0356901 | A1* | 11/2023 | Falzoni | B65D 41/3428 |
| 2024/0025095 | A1* | 1/2024 | Scherer | B29C 45/0081 |
| 2024/0034519 | A1* | 2/2024 | Dubach | B65D 5/748 |
| 2024/0059465 | A1* | 2/2024 | Falzoni | B65D 41/34 |
| 2024/0199285 | A1* | 6/2024 | Bloom | B29C 45/0081 |
| 2024/0262587 | A1* | 8/2024 | Gonzalez Sanchez | |
| | | | | B65D 55/16 |
| 2024/0286801 | A1* | 8/2024 | Bucher | B65D 41/36 |
| 2024/0317467 | A1* | 9/2024 | Berroa García | B65D 41/3447 |
| 2024/0417149 | A1* | 12/2024 | Falzoni | B65D 55/16 |
| 2024/0425252 | A1* | 12/2024 | Gonzalez Sanchez | |
| | | | | B65D 55/16 |

* cited by examiner

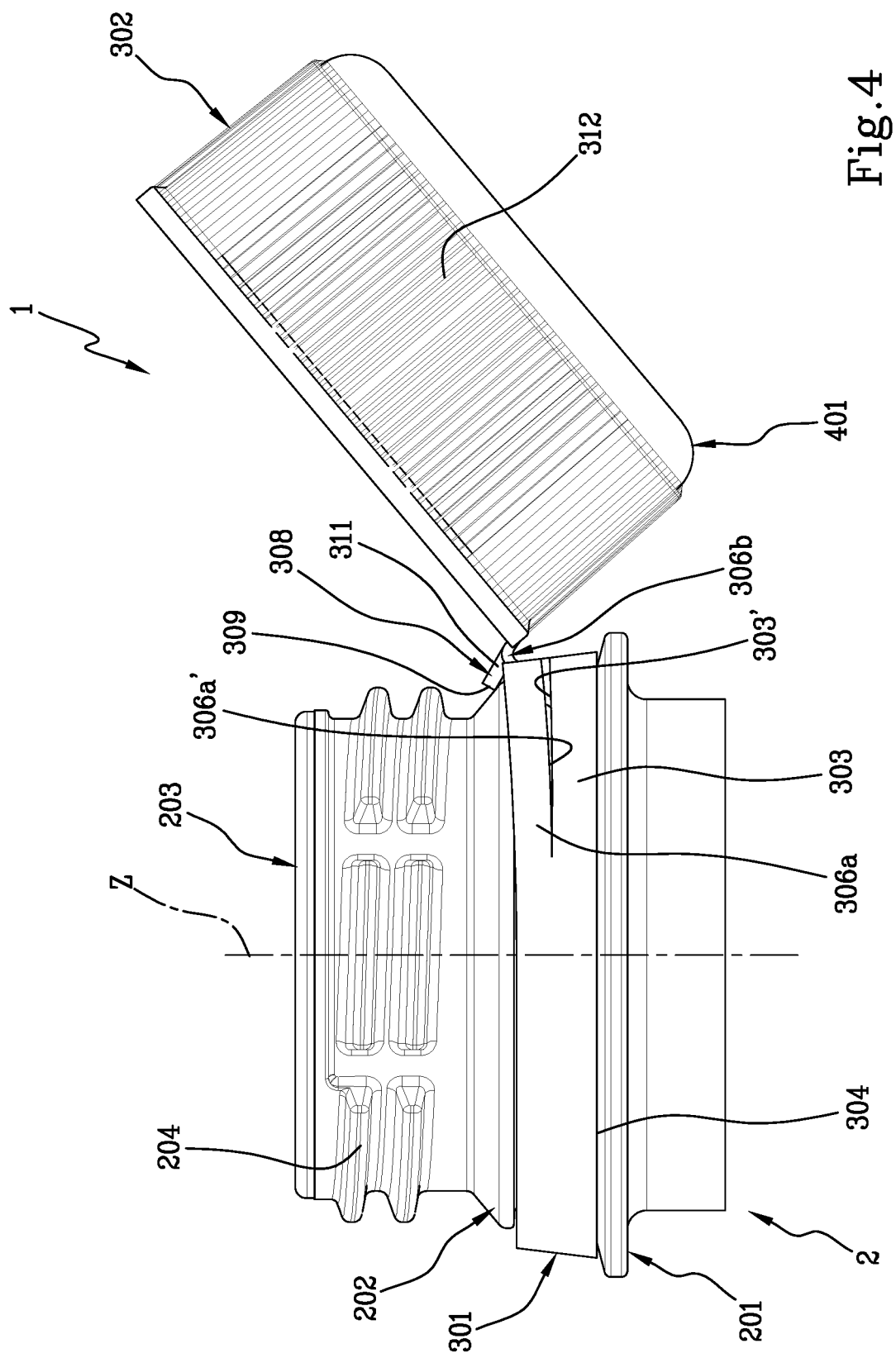

CAP FOR CONTAINER

This invention relates to a cap for a container.

In particular, the invention relates to a cap provided with a retaining ring, joinable to a container neck, the cap also being provided with a closing element which, after opening, remains connected to the retaining ring.

The cap is particularly, but not exclusively, suitable for bottles intended to contain liquid substances.

There are prior art bottle caps comprising a cup-shaped body provided with a lateral wall extending around an axis, which is provided with an inner thread suitable for engaging with an outer thread of a neck of the bottle. The prior art caps are also provided with a tamper-evident ring connected to the cup-shaped body by means of a tear line provided with a plurality of breakable elements, for example breakable bridges. When the cap is unscrewed and is opened for the first time, the cup-shaped body separates from the tamper-evident ring along the tear line as a result of breaking of the breakable bridges. The tamper-evident ring remains joined to the neck of the bottle, whilst the cup-shaped body can be unscrewed by the user, who in this way separates the cup-shaped body from the bottle to access the contents of the bottle. Subsequently, the cup-shaped body can be screwed onto the neck again to reclose the bottle.

Sometimes, after the bottle has been emptied, the user throws the cup-shaped body on the ground, intentionally or accidentally, whilst the bottle, together with the tamper-evident ring joined to it, is correctly thrown in a waste bin. Obviously, this is unwanted behaviour.

In order to overcome this disadvantage, caps have been proposed which are provided with a separating line made in a lateral wall of the cap and circumferentially interrupted to define a retaining ring, configured to remain anchored to a neck of the container, and a closing element, removably engageable with the neck, so as to open or close the container. The separating line has two ends, that is to say, a first end and a second end, between which a joining zone is present which connects the closing element and the retaining ring. The retaining ring is provided with a retaining portion, which extends as far as a free edge of the cap and is configured to internally engage with a locking ring of the neck. These caps additionally comprise an incision line also provided on the lateral wall to define, together with the separating line, two connecting bands which are positioned to connect the closing element and the retaining portion to each other, whose length is determined by the angular extent of a respective lateral stretch of the incision line.

The closing element can be rotated between an open condition, in which a user can access the contents of the bottle while the closing element is resting on the neck, and a closed condition, in which the closing element prevents access to the bottle. When the cap is in the open condition, between the cap joining zone and the neck of the container, there is an interference which makes it difficult for the cap to be able to rotate around the neck.

The connecting bands keep the closing element joined to the retaining ring and therefore to the bottle, preventing the possibility of the closing element being thrown on the ground independently from the bottle and they must be sturdy, so that use does not make them break, and deformable, to allow movement of the closing element relative to the neck in the open condition. Indeed, the connecting bands allow the closing element to be moved away from the retaining portion of the retaining ring, which remains anchored to a locking ring of the neck during opening of the container, and allow the closing element to be inclined so as to rotate it and place it resting on the neck.

There are also other prior art caps which have a tab circumferentially interposed between the first connecting band and the second connecting band, which can be placed resting on the neck of the container in its open condition so as to prevent any rotating movement of the closing element, either towards the supply opening or around the neck of the bottle.

The Applicant has verified that the length of the connecting bands, determined by the angular dimension of the lateral stretches of the incision line, affects the stability of the locking of the closing element in the open condition and also affects the ease with which the closing element can pass from the open condition to the closed condition, and vice versa.

Indeed, if the connecting bands are short, together with the tab they help to keep the closing element stably anchored in the open condition, since they apply a traction towards the neck, thereby strengthening the interference between the joining zone and the neck, but making it difficult for a user to make the closing element pass from the open condition to the closed condition, and vice versa.

Indeed, to open the container, the user must initially unscrew the closing element from the neck in such a way as to separate the closing element from the retaining ring, which remains locked by the locking ring, and must pull the first connecting band and the second connecting band upward, to move them away from both the closing element and the retaining portion. Subsequently, continuing to unscrew the closing element, the user can vertically disengage the closing element from the neck but, in order to allow the container to be opened, must also rotate it so as to be able to position it inclined relative to the neck in the open condition and place the tab resting on the neck.

In the case of short connecting bands, the vertical translation is particularly difficult, as is the rotation of the closing element during the passage from the open condition to the closed condition, and vice versa.

In contrast, in the case of long connecting bands, the user is helped to open and close the cap since during opening he or she can easily move the closing element away from the neck of the container vertically and subsequently rotate it until it is in the open condition, and vice versa during closing he or she can move the inclined closing element away from the neck of the container to rotate it again, position it over the neck and screw it into the closed condition. However, in the open condition, it is only the interference due to the tab between the joining zone and the neck of the container which keeps the closing element locked in the open condition, since the connecting bands are slack and do not apply any traction on the closing element towards the neck.

The Applicant also carried out use tests with connecting bands having intermediate length, between short and long, however these did not provide a solution because they highlighted the same problems as the short and long connecting bands without having their advantages.

In addition, the joining zone, between the first end and the second end of the separating line, performs the function of a hinge element, around which the closing element can be rotated. The Applicant also noticed that, irrespective of the length of the connecting bands, the continuous stressing of the joining zone over time can weaken the joining zone itself, putting its durability at risk.

Document U.S. Pat. No. 6,474,491 shows a cap for a container comprising a ring retained axially on a part of the container, and two arms having the shape of an arc of a circle, which allow the cap to be inclined outwards relative to the container, each of which is connected on one side to the cap by means of a hinge made with a film, and on the other side to the ring.

Document US2020207525A1 shows a cap for a container comprising a body, an indication ring and a hinge which connects the body of the cap and the indication ring to each other. The cap comprises a slit positioned in the indication ring, the slit being placed below the hinge. A cut portion is cut through the body of the cap and through the indication ring above the slit in such a way that the hinge placed inside the cut portion defines a support capable of making contact with the walls of the neck of the container.

Document KR100981240 shows a cap comprising a body, an indication ring and a hinge which connects the body of the cap and the indication ring to each other. The indication ring is provided with an incision and, above it, there is a support provided with a projection shaped to rest on the tamper-evident ring. At the sides of the support there are two connectors, recessed relative to the body of the cap, which have respective grooves capable of giving the connectors greater flexibility.

The technical purpose of this invention is therefore to provide a cap for a container, particularly a cap comprising a retaining ring intended to remain joined to a neck of the container and a closing element removably engageable with the neck to allow a user to open or alternatively close the container, which can overcome the disadvantages of the prior art.

The aim of this invention is therefore to provide a cap for a container provided with a retaining ring, a closing element and a tab, wherein the closing element remains connected to the retaining ring even after opening and wherein the closing element is easily movable from the open condition to the closed condition despite the closing element being stably locked on the neck in the open condition.

A further aim of this invention is also to provide a cap for a container wherein the closing element can be rotated during use multiple times while passing from the open condition and vice versa, without the rotation being able to weaken the connection between the closing element and the retaining ring. Another further aim of this invention is also to provide a cap which is simple to make and inexpensive.

The technical purpose specified and the aims indicated are substantially achieved by a cap for a container comprising the technical features set out in one or more of the appended claims. The dependent claims correspond to possible embodiments of the invention.

In particular, the technical purpose and the aims specified are substantially achieved by a closing cap for a container, comprising a lateral wall extending around an axis and a transversal wall positioned at one end of the lateral wall, a separating line being provided on the lateral wall to define a retaining ring, which comprises a retaining portion which extends as far as a free edge of the retaining ring and is configured to internally engage with a locking ring of a neck of the container in such a way as to remain anchored to the neck, and a closing element removably engageable with the neck, so as to open or close the container; the separating line extending between a first end and a second end and being circumferentially interrupted to leave the closing element and the retaining ring joined; and wherein an incision line is provided on the lateral wall between the separating line and the free edge; the cap additionally comprising a tab, configured to rest on the neck when the closing element is in an open condition, and a pair of movement bands, that is to say, a first movement band and a second movement band which are defined between the separating line and the incision line and a pair of hinge bands, that is to say, a first hinge band and a second hinge band, which extend respectively from the first movement band and from the second movement band towards the transversal wall; the tab being circumferentially interposed between the first hinge band and the second hinge band.

Thanks to the presence of the movement bands and of the hinge bands, the closing element can remain connected to the connecting ring even after cap opening and the passage of the closing element from the closed condition to the open condition is also facilitated.

Indeed, a user can easily rotate the closing element and position it inclined resting on the neck by exploiting a height of the hinge bands and avoiding a shearing stress which would be present if they were missing. The result is a flexibility of the hinge bands, which causes the possibility of them deforming when passing to the open condition but also durability over time and a stability of the angle of opening of the closing element in the open condition.

In addition, each movement band can remain relatively short since it is separate and distinct from the respective hinge band and only serves to make the closing element lift up vertically for the height of the neck, so as to disengage it from the neck itself, but not to make the closing element rotate.

It being possible to make each movement band relatively short, it is effective in retaining the closing element towards the neck, when the closing element is in the open condition, since it applies a traction which strengthens the interference between the closing element and the neck, and therefore the stability of the open condition.

In detail, after the closing element has been distanced from the retaining portion and is positioned over the neck thanks to the movement bands, the user can easily rotate the closing element and position it inclined resting on the neck by exploiting the flexibility and deformation of the hinge bands. Similarly, by exploiting the deformation of the hinge bands, the user can also easily disengage the closing element from the neck and return it to its position aligned over the neck, to engage it on the neck again, by rotating it in the opposite direction during the passage to the closed condition.

Thanks to the presence of the movement bands and of the hinge bands, it is therefore advantageously possible both to keep the closing element stably near the neck in the open condition, by suitably defining the length of the movement band, and to have facilitated opening and closing of the cap, being able to exploit the height and the deformation of the hinge band for the rotation of the closing element during the passage to the open condition or during the passage to the closed condition.

According to one embodiment, the first movement band and the first hinge band define a first connecting component, just as the second movement band and the second hinge band define a second connecting component, which are configured to connect the closing element and the retaining ring to each other.

Thanks to the fact that each connecting component has the respective movement band which is made in the retaining ring and extends from the retaining portion, and the respective hinge band made in the closing element, each connecting component is "L"-shaped and connects the closing element to the retaining portion.

According to one embodiment, when the cap is in the closed condition, each movement band is substantially perpendicular to the respective hinge band and this shape promotes the fact that, when passing to the open condition, the deformation affects exclusively the hinge band but not the movement band, which can remain substantially undeformed.

In accordance with a further embodiment, the tab has two lateral edges, defined by means to two inner cuts, that is to say, a first inner cut and a second inner cut, each hinge band having an inner edge directed towards the tab, which is at least partially defined by a respective inner cut.

Thanks to the fact that each inner cut defines both a lateral edge of the tab and an inner edge of a hinge band, the cap is simple to make as it is possible, with a single cutting operation, to define both an edge of the tab and the inner edge of the hinge band.

That makes the cap simple and inexpensive to make.

The invention can be better understood and implemented with reference to the accompanying drawings, which illustrate several example, non-limiting embodiments of it, in which:

FIG. 4 is a side view of the cap of FIG. 1 in an open condition, in which the closing element is at a distance from a neck of the container and the tab is locked resting on the neck, on a locking ring of the neck.

With reference to the accompanying FIGS. 1 to 4, the numeral 1 denotes a cap for closing a container 2, of which only a neck 201 is shown, in particular a bottle intended to contain a liquid substance such as a drink.

It should be noticed that elements common to the various embodiments will be labelled with the same reference numbers.

The cap 1 is made of polymeric material. Any polymeric material suitable for moulding can be used to obtain the cap 1.

Figure 1:
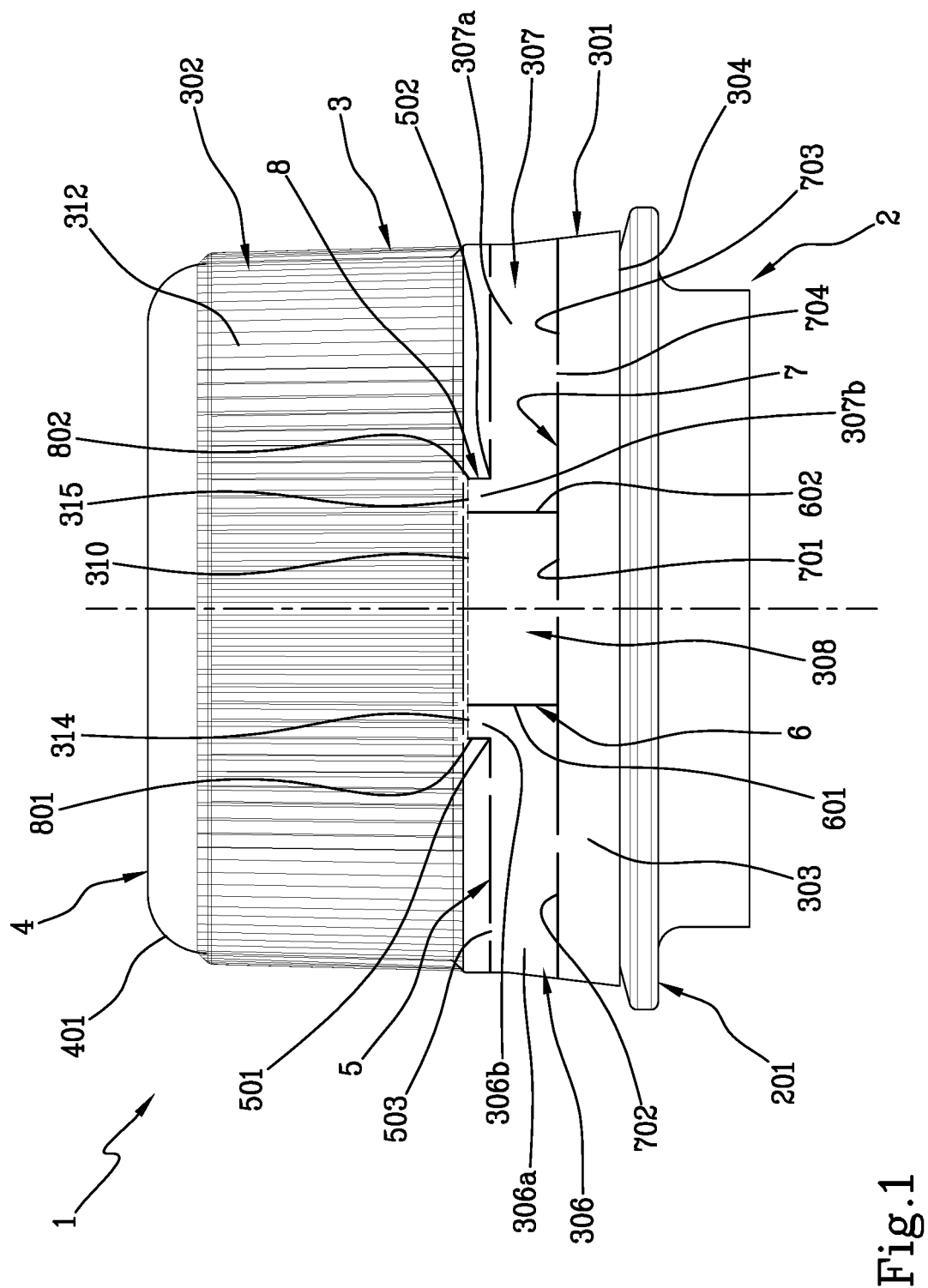
FIG. 1 is a side view of a closing cap for a container, according to the invention, which comprises a separating line and an incision line to define a closing element, a retaining ring, a pair of movement bands and a pair of hinge bands, and a tab interposed between the hinge bands, wherein the cap is in a closed condition.

The cap 1 is shown in FIG. 1 in a closed condition in which the cap 1 is found when it leaves a cap production line and is applied to the neck 201 of the container 2, in combination with it.

In this condition, the cap 1 comprises a lateral wall 3 which extends around an axis Z, and a transversal wall 4 positioned at one end of the lateral wall 3, so as to close that end. The transversal wall 4 extends transversally, in particular perpendicularly, to the axis Z. The transversal wall 4 can be flat, even though other shapes are theoretically possible. In the example shown, the transversal wall 4 has a substantially circular shape in plan view.

The axis Z is a central axis, of symmetry for the cap 1.

The lateral wall 3 and the transversal wall 4 define a cup-shaped body, suitable for receiving an end portion of the neck 201 of the container 2, so that the cap 1 can close the container 2 itself.

In particular, the lateral wall 3 is connected to the transversal wall 4 by means of a connecting zone 401, which may be shaped, in cross section, like a bevelled edge or a circular connector.

The cap 1 comprises a separating line 5, which is provided on the lateral wall 3 to define a retaining ring 301, which is configured to remain anchored to the neck 201 of the container 2.

In detail, the retaining ring 301 is configured to internally engage with a locking ring 202, shown in FIG. 4, which projects from an outer surface of the neck 201, in such a way as to remain anchored to the neck 201 itself.

The locking ring 202 is an annular protuberance which extends in a plane placed transversally to the axis Z.

The separating line 5, on the lateral wall 3, defines not just the retaining ring 301, but also a closing element 302 removably engageable with the neck 201, so as to open or close the container 2 by rotating the closing element 302 around the axis Z.

The closing element 302 is engageable to close a supply opening 203 of the container 2.

The separating line 5 extends around the axis Z and is circumferentially interrupted to leave the retaining ring 301 and the closing element 302 joined. In detail, the separating line 5 extends between a first end 501 and a second end 502.

The separating line 5 may have an angular extent, around the axis Z, greater than or equal to 240° and less than or equal to 350°.

In one embodiment, the angular extent of the separating line 5 may be between 250° and 340°.

It should be noticed that the expression "the angular extent is between" 250° and 340° means, throughout this document, that it may be greater than or equal to 250° and less than or equal to 340°, in other words the range limits indicated are always included in it, not excluded.

The retaining ring 301 comprises a retaining portion 303, which is configured to internally engage with the locking ring 202 and extends as far as a free edge 304 of the retaining ring 301.

The free edge 304 delimits the retaining ring 301 on the opposite side to the transversal wall 4. Therefore, the retaining ring 301 extends between the separating line 5 and the free edge 304 and may be delimited by a cylindrical or frustoconical outer surface. Preferably, the separating line 5 is parallel to the free edge 304.

In other words, the retaining portion 303 is a lower portion of the retaining ring 301, and therefore of the cap 1, when the cap is joined to the container 2 and is configured to keep the retaining ring 301 anchored to the neck 201 of the container 2 when the cap 1 is in an open condition.

The lateral wall 3 may be provided, on an outer surface thereof, with a plurality of knurling lines 312, extending parallel to the axis Z and suitable for aiding gripping of the cap 1 by the user or by the capping machine which applies the cap 1 on the container to be closed.

The knurling lines 312 may be positioned in the closing element 302, but may also continue in the connecting zone 401 and/or in the retaining ring 301.

In the example shown in FIGS. 1 to 4, it should be noticed that the lateral wall 3 comprises a cylindrical portion which extends from the connecting zone 401, on which the knurling lines 312 are made, a widened portion with diameter greater than the cylindrical portion, which extends as far as the free edge 304 of the retaining ring 301 and a connecting portion positioned between the cylindrical portion and the widened portion. The knurling lines 312 are provided on the closing element 302 but not in the connecting zone 401, in the connecting portion and in the widened portion, which are externally delimited by a smooth outer surface, that is to say, which may be free of knurling lines 312. However, that is not necessary, since the knurling lines 312 could also extend on them.

Without limiting the scope of the invention, the separating line 5 is provided on the smooth connecting portion, as shown in FIGS. 1 to 4 but may also be positioned on the cylindrical portion provided with knurling lines 312.

As already indicated, the retaining ring 301 is configured to internally engage with the locking ring 202 in such a way as to remain anchored to the neck 201.

Figure 3:
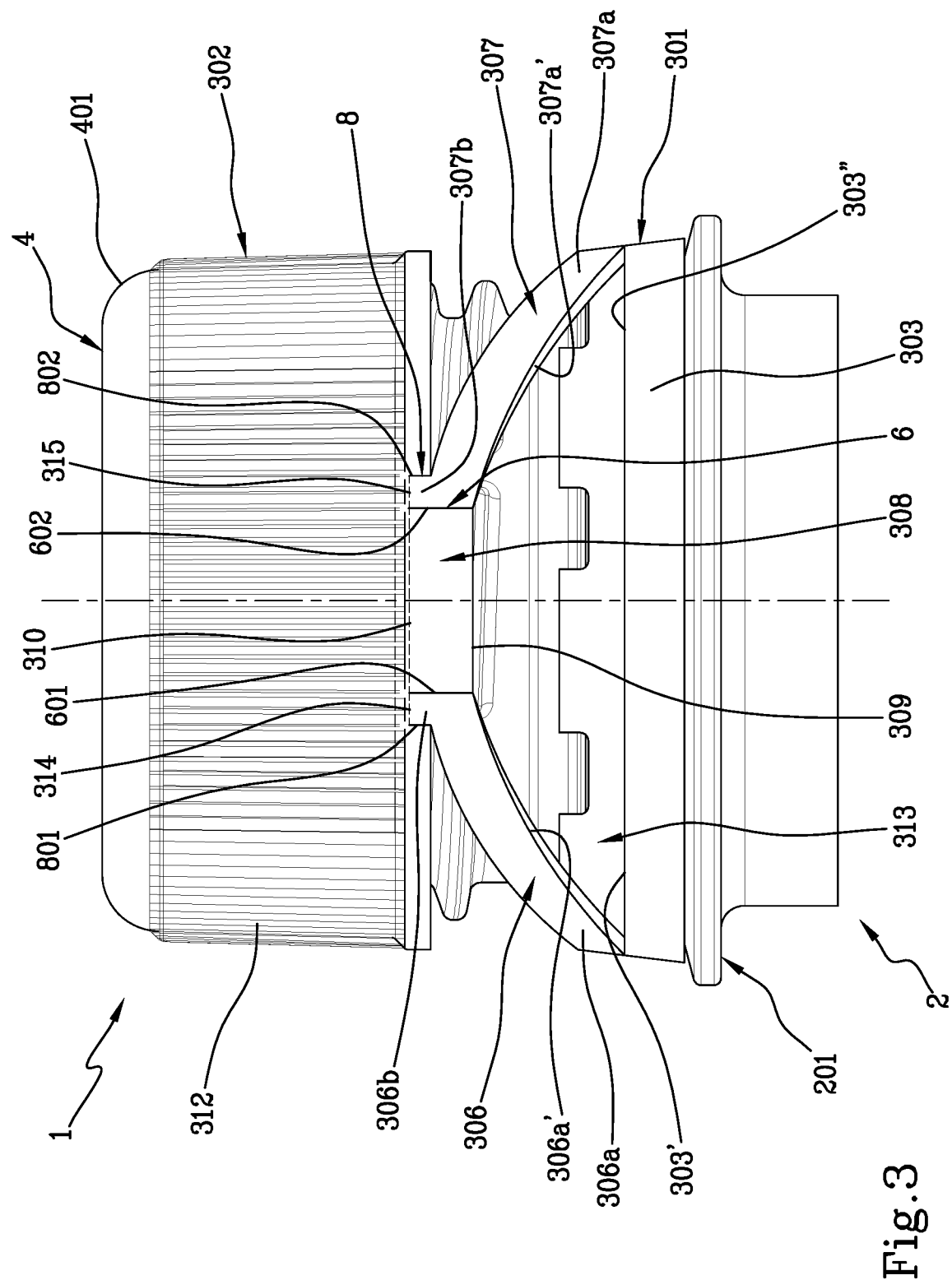
FIG. 3 is the side view of the cap of FIG. 1, in a final step of opening, in which the closing element of the cap is almost completely separated from the retaining ring.

For that purpose, as shown in FIG. 3, the retaining ring 301 is internally provided with an engaging element 313, suitable for engaging with the locking ring 202. The engaging element 313 is configured to abut against the locking ring 202 in order to prevent axial movements of the retaining ring 301, away from the neck 201, when the closing element 302 is moved away from the neck 201.

In detail, it is the retaining portion 303 of the retaining ring 301 which is provided with the engaging element 313, in such a way that it is kept anchored to the locking ring 202 even when the closing element 302 is in the open condition and is locked at a distance from the neck 201 and from the supply opening 203 of the neck 201.

The engaging element 313 is shaped like an annular element which is bent around the free edge 304 inwards towards the inside of the retaining portion 303. In detail, the annular element may be continuous or interrupted. Indeed, there may be a plurality of bent elements, shown in FIG. 3, shaped like tabs, which project from the free edge 304 and are bent inwards towards the inside of the retaining portion 303 to form the engaging element. Alternatively, according to one embodiment not illustrated, the engaging element 313 may be shaped like a continuous or interrupted protuberance, which from an inner surface of the retaining portion 303 projects towards the axis Z to engage with the locking ring 202.

As shown at least in FIGS. 3 and 4, the cap 1 additionally comprises a coupling structure, or thread, not illustrated, positioned on the inside of the lateral wall 3 and configured to removably couple the closing element 302 to the neck 201 of the container 2, in such a way that the cap 1 is movable from the closed condition, in which the cap 1 closes the supply opening 203 of the container 2, to the open condition.

The coupling structure of the cap 1 is positioned inside the closing element 302 and is shaped to engage with a corresponding coupling structure 204 present on the outside of the neck 201 of the container 2 to removably couple the closing element 302 to the neck of the container.

The coupling structure of the closing element 302 and the coupling structure 204 of the neck 201 are, as illustrated in the accompanying Figures, made in the form of a thread to allow the cap to be unscrewed from or screwed onto the neck.

The cap 1 comprises an incision line 7, also provided on the lateral wall 3 between the separating line 5 and the free edge 304, and a tab 308, which is configured to rest on the neck 201 when the closing element 302 is in the open condition.

According to this invention, the cap 1 comprises a pair of movement bands 306a, 307a, that is to say, a first movement band 306a and a second movement band 307a, which are defined between the separating line 5 and the incision line 7, and a pair of hinge bands 306b, 307b, that is to say, a first hinge band 306b and a second hinge band 307b, which extend respectively from the first movement band 306a and from the second movement band 307a towards the transversal wall 4, the tab 308 being circumferentially interposed between the first hinge band 306b and the second hinge band 307b.

In other words, from circumferentially opposite sides, the pair of hinge bands 306b, 307b at least partially delimit the tab 308.

The fact that the cap 1 comprises a pair of movement bands 306a, 307a and a pair of hinge bands 306b, 307b advantageously allows both the movement bands 306a, 307a and the hinge bands 306b, 307b to be suitably sized.

Thanks to the movement bands 306a, 307a, it is possible to lock the cap 1 stably on the neck 201 in conjunction with the tab 308 in the open condition and at the same time, thanks to the hinge bands 306b, 307b, it is possible to exploit their flexibility and deformability for the rotation of the cap 1 during the passage to the open condition or to the closed condition.

It should be noticed that the movement bands 306a, 307a are joined to the respective hinge bands 306b, 307b.

Indeed, the first movement band 306a and the first hinge band 306b define a first connecting component 306 whilst the second movement band 307a and the second hinge band 307b define a second connecting component 307.

Therefore, the cap 1 comprises a pair of connecting components 306, 307 configured to connect the closing element 302 and the retaining ring 301 to each other. In detail, each connecting component 306, 307 connects the closing element 302 to the connecting portion 303 and is "L"-shaped, when the cap 1 is in the closed condition.

According to one embodiment, as indicated in more detail below, when the cap 1 is in the closed condition, each movement band, 306a, 307a is substantially perpendicular to the respective hinge band 306b, 307b and this shape promotes the fact that, when passing to the open condition, there is a deformation which affects exclusively the hinge band 306a, 307a but not the respective movement band 30306b, 307b which can remain substantially undeformed.

Between the first end 501 and the second end 502 of the separating line 5, the hinge bands 306b, 307b define a joining zone, to which the tab 308 is also connected, which connects the closing element 302 and the retaining ring 301 to each other.

It should be noticed that the movement bands 306a, 307a are made in the retaining ring 301 whilst the hinge bands 306b, 307b are made in the closing element 302 and they are joined to each other.

Advantageously, in the open condition the tab 308 may rest on the neck 201 near the locking ring 202. Indeed, it is in connection with the shape of the retaining ring 301 and/or of the locking ring 202 and/or of the tab 308 and/or the total length of the connecting components 306 and 307, that the inclination of the closing element 302 relative to the neck 201 is determined, which in turn determines the resting of the tab 308 on the neck 201, as shown in FIG. 4.

The separating line 5 and the incision line 7 may be made as cutting lines by means of a cutting operation on a concave body obtained by moulding.

The cutting lines may pass through the entire thickness of the lateral wall, or not pass through if the thickness of the lateral wall is to be only partially cut.

Preferably, the separating line 5 and the incision line 7 are made by means of through cuts passing through an entire thickness of the lateral wall.

Preferably, along the separating line 5 there may be a plurality of breakable bridges 503, whilst optionally along the incision line 7, there may be a plurality of breakable elements 704, those breakable bridges 503 and breakable elements 704 being intended to break the first time the cap 1 is opened. The breakable elements 704 may be positioned in angularly offset positions around the axis Z relative to the breakable bridges 503.

Preferably, the breakable bridges 503 and the breakable elements 704 may be provided both along the separating line 5 and also on the incision line 7 but, preferably, the incision line 7 is free of breakable elements 704.

The tab 308 has an end edge 309, defined by a central stretch 701 of the incision line 7 which is configured to be directed, when the cap 1 is in the open condition, towards the neck 201, or towards the supply opening 203, of the container 2.

The central stretch 701 is positioned in a plane positioned transversally, in particular perpendicularly, to the axis Z, which is parallel to a separating plane (not illustrated) containing the separating line 5.

The central stretch 701 of the separating line 7 in the closed condition is facing the retaining portion 303.

The tab 308 also has two lateral edges 311, shown in FIG. 4, defined by means of a pair of inner cuts 6, that is to say, a first inner cut 601 and a second inner cut 602, which are provided on the lateral wall 3.

Each hinge band 306b, 307b has an inner edge directed towards the tab 308 which is also, at least partially, defined by the respective inner cut 6.

In this way, since each inner cut 6 defines both a lateral edge of the tab 308 and an inner edge of the respective hinge band 306b, 307b, the cap is simple to make. Indeed, with a single cutting operation, it is possible to define both an edge of the tab and the inner edge of the hinge band 306b, 307b and this reduces the cutting operations necessary for making the cap. That makes the cap simple and inexpensive to make.

It should be noticed that the two inner cuts 6 extend from opposite ends of the central stretch 701 of the incision line 7 towards the transversal wall 4.

The inner edge of the first hinge band 306b is defined by the first inner cut 601 whilst the inner edge of the second hinge band 307b is defined by the second inner cut 602.

The inner cuts 6 extend axially beyond the separating line 5.

The cap 1 also comprises a pair of outer cuts 8, that is to say, a first outer cut 801 and a second outer cut 802, which are also provided on the lateral wall 3, which extend respectively from the first end 501 and from the second end 502 of the separating line 5 towards the transversal wall 4.

In this way, each hinge band 306b, 307b has an outer edge defined by a respective outer cut 8 and is therefore circumferentially defined between an outer cut 8 and an inner cut 6 and is respectively delimited by the outer edge and by the inner edge defined by them.

In more detail, the first hinge band 306b extends between the outer edge and the inner edge defined by the first outer cut 801 and by the first inner cut 601 whilst the second hinge band 307b extends, circumferentially on the opposite side of the tab 308, between the inner edge and the outer edge defined by the second inner cut 602 and by the second outer cut 802.

Since both the inner cuts 6 and the outer cuts 8 extend axially beyond the separating line 5, advantageously, each hinge band 306b, 307b also extends beyond the separating line 5 towards the transversal wall 4.

As shown in FIGS. 1 to 4, the inner cuts 6, that is to say, the first inner cut 601 and the second inner cut 602, as well as the outer cuts 8, that is to say, the first outer cut 801 and the second outer cut 802 which define the tab 308 and the hinge bands 306b, 307b are parallel to each other and parallel to the axis Z so that, when the cap is in the closed condition, the hinge bands 306b, 307b are shaped like strips with outer edges and inner edges which are parallel to each other having a median line parallel to the axis Z.

The arrangement of the inner cuts 6 and of the outer cuts 8 parallel to each other is not necessary, as indicated below. However, that parallel arrangement facilitates cutting operations since it is possible to place cutting tools, such as blades, parallel to each other, making them engage one after another with the lateral wall 3 of the cap 1 during a rotation of the cap 1 around its own axis.

This also makes the cap 1 easy to make and therefore allows the possibility of making the cap 1 inexpensively.

If the inner cuts 6 and the outer cuts 8 are parallel to the axis Z, they are perpendicular relative to the end edge 309 of the tab 308 defined by the central stretch 701.

With the inner cuts 6 and the outer cuts 8 parallel to the axis Z, the hinge bands 306b, 307b are substantially perpendicular to the respective movement band 306a, 307a, when the cap 1 is in the closed condition.

The inner cuts 6 may have a same first height along the axis Z, just as the outer cuts 8 may also have a respective same second height along the axis Z, the second height being less than the first height.

If the inner cuts 6 and the outer cuts 8 are parallel to the axis Z and if the difference between the first height and the second height corresponds to the height of the movement bands 306a, 307a of the connecting components 306, 307 along the axis Z, then the inner cuts 6 and the outer cuts 8 have upper ends positioned in a same plane which is perpendicular to the axis Z, as shown in FIGS. 1 to 4.

It should be noticed that the tab 308 is connected to the lateral wall 3 by means of a hinge line 310. It should be noticed that the hinge line 310 is a virtual line which in the lateral wall 3 defines a zone around which the tab 308 may optionally bend, for example during the passage in the closed condition to the open condition. In contrast, when the closing element is in the open condition and is rotated relative to the neck 201 in order to rest on the neck 201 near the locking ring 202, the tab 308 does not bend but remains in line with the closing element 302.

The tab 308 may have the shape of a rectangle connected to the lateral wall 3 at the hinge line 310, for example as shown in the accompanying Figures. Indeed, the inner cuts 6 define the lateral edges 311 of the tab 308 and are perpendicular to the end edge 309, and to the hinge line 310. The end edge 309 is a free edge of the tab 308, which is positioned on the opposite side to the hinge line 310. The hinge line 310 extends circumferentially between the upper ends of the inner cuts 6, that is to say, between the upper ends of the first inner cut 601 and of the second inner cut 602.

Each hinge band 306b, 307b is connected to the lateral wall 3 by means of a respective further hinge line 314, 315, that is to say, a first further hinge line 314 for the first hinge band 306b and a second further hinge line 315 for the second hinge band 307b, around which each hinge band 306b, 307b may optionally bend during the passage in the closed condition to the open condition. The first further hinge line 314 and the second further hinge line 315 are also virtual lines which are defined in the lateral wall 3.

If the upper ends of the inner cuts 6 and of the outer cuts 8 lie in the same plane, as shown in FIGS. 1 to 4, then the hinge line 310 and the further hinge lines 314, 315 are aligned and also lie in the same plane.

It should be noticed that the hinge line 310 and the further hinge lines 314, 315 are both positioned on the closing element 302.

However, it is not necessary for the inner cuts 6 and the outer cuts 8 to be parallel to each other and parallel to the axis Z, or have equal length, that is to say, it is not necessary for the tab 308 to have the shape of a rectangle, or for the hinge bands 306b, 307b to be strips with edges which are parallel to each other, and also parallel to the axis Z.

Indeed, according to one embodiment not illustrated, the upper ends of the inner cuts 6 may lie in a respective first plane (the first inner cut 601 has the same height as the second inner cut 602) whilst the upper ends of the outer cuts 8 may lie in a second plane (the first outer cut 801 has the same height as the second outer cut 802), the first plane and the second plane being perpendicular to the axis Z but being parallel to each other. In this case, whilst the hinge line 310 lies in the first plane, the further hinge lines 314, 315 may lie in a plane transversal to the axis Z and be inclined.

Moreover, according to one embodiment not illustrated, the lateral edges 311 of the tab 308 may be curved and, therefore, an equal curve may be seen in the inner cuts 6 from which it is possible to obtain the lateral edges 311 of the tab 308 as well as the inner edges of each hinge band 306b, 307b.

The outer edges of each hinge band 306b, 307b may also be curved if defined by respective curved outer cuts 8.

Preferably, the inner cuts 6 and the outer cuts 8 are made by means of cutting lines which pass through an entire thickness of the lateral wall 3.

If we now consider a plane passing through the axis Z, it should be noticed that the lateral wall 3 has a substantially constant thickness at the inner cuts and at the outer cuts 8. Indeed, special shapes of the lateral wall of the cap 1 are not necessary to make each hinge band 306b, 307b.

However, it could be optionally advantageous to have present zones, not illustrated, which extend parallel to the axis Z, in each of which a respective inner cut 6 and/or outer cut 8 is made, which have along a line perpendicular to the axis Z a first thickness of the lateral wall 3 which is less than a second thickness of the same lateral wall 3 positioned adjacent to those zones.

In each zone, the first thickness, or the second thickness, are constant if we consider a plane passing through the axis Z.

Those zones may define, for example inside the lateral wall 3, respective recesses which make it easier to make the inner cuts 6 and/or the outer cuts 8 if they are made by means of operations for cutting the lateral wall 3 performed by suitable cutting tools, for example cutting blades.

The size of the first thickness being smaller than that of the second thickness, the cutting tools can more easily guarantee correct cutting of the entire thickness of the lateral wall 3 in the zones with reduced thickness, without the need for contact elements in contact with the inner surface of the lateral wall 3.

This simplifies the cap 1 production process.

Optionally, but not according to a preferred embodiment, along the outer cuts 8 there may be one or more breakable points intended to be broken the first time the cap 1 is opened. Alternatively, the outer cuts 8 may be shaped like lines of weakness at which the closing element 302 has a thickness which is less than the thickness of the surrounding zones. Along those lines of weakness, the material of which the closing element 302 is made is intended to break, the first time the cap 1 is opened.

The incision line 7 comprises a pair of lateral stretches 702, 703, in which a first lateral stretch 702 defines, with a first part of the separating line 5 which extends from the first end 501 of the separating line 5, the first movement band 306a and a second lateral stretch 703 defines, with a second part of the separating line 5 which extends from the second end 502 of the separating line 5, the second movement band 307a.

The central stretch 701 of the incision line 7 is positioned between the inner cuts 6 but it is also circumferentially interposed between the first lateral stretch 702 and the second lateral stretch 703 of the incision line 7.

Therefore, the first movement band 306a and the second movement band 307a extend from circumferentially opposite end portions of the incision line 7 and are therefore positioned circumferentially on opposite sides of the tab 308.

It should be noticed that the incision line 7 has an angular extent, measured around the axis Z, which is greater than the angular distance (also measured around the axis Z) between the first end 501 and the second end 502 of the separating line 5.

The first lateral stretch 702 and the second lateral stretch 703 of the incision line 7 are both perpendicular to the axis Z and are aligned. However, in one embodiment not illustrated, the two lateral stretches 702 and 703 could be slightly inclined relative to each other and have different inclinations, not necessarily parallel to each other.

The first lateral stretch 702 and the second lateral stretch 703 preferably extend in a plane (not illustrated) parallel to the separating plane, which is transversal to the axis Z, in particular perpendicular to the axis Z.

In this way, the movement bands 306a, 307a may be shaped like strips which have a centre line which lies in a plane perpendicular to the axis Z, which are perpendicular to the hinge bands 306b, 307b, if the hinge bands are defined by inner cuts 6 and outer cuts 8 parallel to the axis Z.

As already indicated, the perpendicularity between the hinge bands 306b, 307b and the movement bands 306a, 307a promotes, when passing to the open condition, deformation only of the hinge bands 306b, 307b since the movements bands 306a, 307a incline when the closing element 302 is lifted vertically and, subsequently, when it rotates to move away from the neck 201, but remain substantially undeformed.

In the case of inner cuts 6 and outer cuts 8 which are inclined relative to the axis Z, each hinge band 306b, 307b may be transversal relative to the respective movement band 306a, 307a.

The angular extent of the lateral stretches 702, 703 determines the length of the movement bands 306a, 307a, which may be greater than the height of the respective hinge bands 306b, 307b and thereby defines the "L"-shape of each connecting band 306, 307.

The movement bands 306a, 307a may be sized to have a small length so as to lock the closing element 302 stably on the neck 201 of the container 2 when the cap 1 is in the open condition, and at the same time the hinge bands 306b, 307b may be sized to have a height which facilitates the rotation of the closing element 302 in the open condition and vice versa, in the closed condition. In other words, each connecting component 306, 307 comprises a movement band 306a, 307a and a hinge band 306b, 307b which may be sized in such a way as to guarantee maximum effectiveness in both of the above-mentioned technical effects.

The incision line 7 is positioned between the separating line 5 and the free edge 304.

Figure 2:
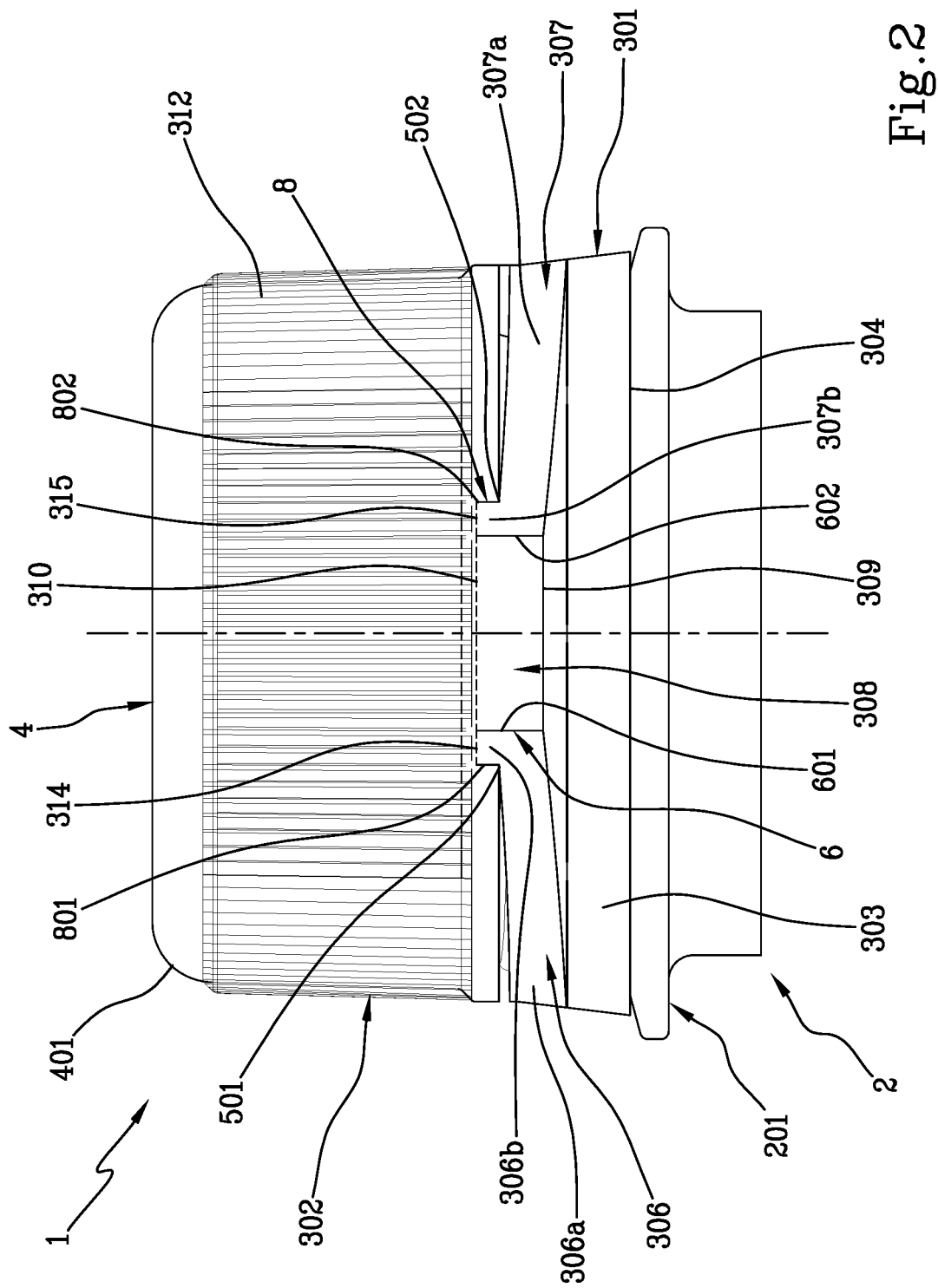
FIG. 2 is the side view of the cap of FIG. 1, in an initial step of opening, in which the closing element of the cap begins to be separated from the retaining ring.

When the cap 1 is in the open condition, as shown at least in FIGS. 2 to 4, the first lateral stretch 702 and the second lateral stretch 703 respectively define a first free lower edge 306a', and a second free lower edge 307a' respectively of the first movement band 306a and of the second movement band 307a of the connecting components 306, 307.

In addition, the first lateral stretch 702 and the second lateral stretch 703 also define a first free upper edge 303' and a second free upper edge 303" of the retaining portion 303.

The separating line 5 is positioned at a distance from the free edge 304 of the retaining ring 301 which determines the height of the retaining ring 301 along an axis parallel to the axis Z.

The first lateral stretch 702 and the second lateral stretch 703 are positioned at a second distance from the free edge 304 along an axis parallel to the axis Z, which determines the height of the retaining portion 303.

If the separating line 5 and the incision line 7 are parallel to each other and perpendicular to the axis Z, the height of the movement bands 306a, 307a is determined by the axial distance between the separating line 5 and the incision line 7.

As indicated in more detail below, different variants of the cap 1 may be identified depending on the position and shape of the incision line 7 relative to the separating line 5.

In the cap 1 shown in FIGS. 1 to 4, it should be noticed that the central stretch 701 lies in the same plane in which the lateral stretches 702, 703 of the incision line 7 lie and forms a tab 308 whose end edge 309 is aligned with each movement band 306a, 307a.

In particular, the end edge 309 of the tab 308 is aligned with the first free lower edge 306a', and with the second free lower edge 307a', of the movement bands 306a, 307a.

If we consider a height of the tab 308, this is determined by the height of the inner cuts 6.

As shown in FIGS. 2 and 3, during the passage to the open condition the first movement band 306a and the second movement band 307a are configured to be positioned at a distance from both the closing element 302 and the retaining portion 303 and to remain joined to the retaining portion 303 respectively at an outer end of the first lateral stretch 702 of the incision line 7 and at an outer end of the second lateral stretch 703 of the incision line 7, the outer end of the first lateral stretch 702 and the outer end of the second lateral stretch 703 externally delimiting the incision line 7 circumferentially.

In this way, the first movement band 306a and the second movement band 307a may adopt a trapezium shape shown in FIG. 2 and in FIG. 3 and it can be noticed how the tab 308 is centrally positioned, in the smaller base of the trapezium, whilst the hinge bands 306b, 307b are still undeformed and are part of the closing element 302.

After the closing element 302 has disengaged from the neck 201 and is placed over the supply opening 203, the closing element 302 may be rotated relative to the neck 201 around the hinge bands 306b, 307b, which are configured to keep the closing element 302 connected to the neck 201 and to deform in such a way as to allow rotation of the closing element 302 relative to the neck 201.

As shown in FIG. 4, in the open condition the tab 308 may rest on the neck 201 to lock the closing element 302 at a distance from the neck 201 by exploiting the deformation of the hinge bands 306b, 307b.

It can be noticed how the deformation only affects the first hinge band 306b and the second hinge band 307b but not the first movement band 306a and the second movement band 307a, which therefore may remain substantially undeformed and do not twist in the open condition.

Indeed, the first hinge band 306b and the second hinge band 307b are elements independent of the first movement band 306a and of the second movement band 307a.

For this reason, it is also possible to size the first movement band 306a and the second movement band 307a in such a way that they are suitably short, so that they apply a traction on the closing element 302 capable of keeping it stably near the neck 201.

According to one variant of the cap 1, not illustrated, the first lateral stretch 702 and the second lateral stretch 703 are aligned with each other and lie in the plane parallel to the separating plane but the central stretch 701 lies in a further plane parallel to the separating plane, which is also parallel to the plane in which the first lateral stretch 702 and the second lateral stretch 703 lie, which is positioned between the latter and the free edge 304, to form a tab 308 whose end edge 309 projects relative to the first movement band 306a and to the second movement band 307a of the connecting components 306, 307.

In this case too, the height of the tab 308 is determined by the height of the inner cuts 6, which extend from the central stretch 701 until they intercept the lateral stretches 702 and 703 and continue axially beyond the separating line 5.

In use, the cap 1 is applied on the neck 201 of the container 2 in the closed condition. The cap 1 is positioned in such a way that the engaging element 313 provided inside the retaining ring 301, in particular on the retaining portion 303 is below the locking ring which is present on the neck.

When the cap 1 is in the closed condition, the first movement band 306a and the first hinge band 306b, as well as the second movement band 307a and the second hinge band 307b are perpendicular to each other and respectively define a first movement component 306 and a second movement component 307 which are "L"-shaped.

When the user wishes to open the container for the first time, the user grips the closing element 302 and rotates the closing element 302 around the axis Z, in order to unscrew the closing element 302 from the neck in the opening direction. Initially, the closing element 302 and the retaining ring 301 are rotated together around the axis Z, and they simultaneously move together in a direction parallel to the axis Z, away from the neck 201, the coupling structure of the cap 1 engaging with the corresponding coupling structure 204 of the neck 201 of the container 2.

This occurs until the engaging element 313 of the retaining portion 303 abuts against the locking ring 202 provided on the neck 201. At this point, the locking ring 202 prevents the retaining portion 303 from rising further along the axis Z, acting as a stop for the movement of the retaining portion 303, and therefore of the retaining ring 301, away from the neck.

The closing element 302, which is unscrewed by the user, continues to move along the axis Z away from the neck. The breakable bridges 503 are thereby tensioned, until causing them to break. The closing element 302 consequently separates from the retaining ring 301 along the separating line 5, but remains joined to the retaining ring 301 since the separating line 5 is interrupted.

In particular with reference to FIGS. 2 and 3, if the user continues to unscrew the closing element 302, so as to move the closing element 302 along the axis Z to remove it from the neck, the first movement band 306a and the second movement band 307a deform since they extend between the retaining portion 303, locked by the locking ring 202, and the closing element 302, which moved away from the locking ring 202 and was lifted upwards. If present, the breakable elements 704 of the incision line 7 are also tensioned, until causing them to break.

The first movement band 306a and the second movement band 307a are distanced from both the closing element 302 and the retaining portion 303 and remain joined to each other thereby adopting a trapezium shape whilst the tab 308 is centrally positioned, in the smaller base of the trapezium.

The first hinge band 306b and the second hinge band 307b continue to remain undeformed and are transversal, that is to say, inclined, relative to the first movement band 306a and to the second movement band 307a. Each connecting component 306, 307 is still "L"-shaped but the arms of the "L" are inclined relative to each other.

The first movement band 306a and the second movement band 307a of the connecting components 306, 307 are sized in such a way that, continuing to unscrew the closing element 302, the latter can disengage from the coupling structure, or thread, made on the neck 201, moving into a position over the supply opening 203, so that the container 2 can be opened. In contrast, the retaining portion 303 of the retaining ring 301 remains anchored to the neck. However, it is not necessary for the first movement band 306a and the second movement band 307a to have a length greater than the minimum necessary to ensure that the closing element 302 can disengage from the neck 201.

Indeed, the user can rotate the closing element 302 relative to the neck 201 deforming the first hinge band 306b and the second hinge band 307b, whose height guarantees them flexibility and deformability.

The height of the hinge bands 306b, 307b may be suitably sized, by selecting the height of the inner cuts 6 and of the outer cuts 8, even to guarantee the sturdiness of the hinge bands 306b, 307b over time.

In the open condition, the tab 308 stably rests on the neck 201 and the first movement band 306a and the second movement band 307a, which may be sized with small dimensions, are capable of strengthening the stability of the open condition.

During the opposite passage to the closed condition, the user must move the closing element 302 away from the neck 201 by exploiting the height of the first hinge band 306b and of the second hinge band 307b to disengage the tab 308 from the neck 201 of the container 2.

Thanks to the fact that the first hinge band 306b and the second hinge band 307b are present, the user can pull and bend those hinge bands 306b, 307b to bring the closing element 302 over the supply opening 203 again.

The cap 1, previously described is made of plastic material, for example polypropylene (PP) or polyethylene (PE).

If PE is used, its density may range from low density to high density. In particular, it is possible to use high density polyethylene (HDPE).

The high density polyethylene (HDPE) used to make the cap previously described may have the following properties:
  density variable between 950 and 968 kg/m3;
  melt index variable from 0.3 to 20 g, in the following measuring conditions: 10 minutes, 190° C., 2.16 kg;
  molecular weight distribution wide, or narrow, or unimodal, or multimodal.

If PP is used, that material may be in the form of a homopolymer, or heterophasic copolymer, or even statistical copolymer.

The melt index of PP may vary from 2 to 20 g, in the following measuring conditions: 10 minutes, 230° C., 2.16 kg.

The invention claimed is:

1. A closing cap (1) for a container (2), comprising a lateral wall (3) extending around an axis (Z) and a transversal wall (4) positioned at one end of the lateral wall (3), a separating line (5) being provided on the lateral wall (3) to define a retaining ring (301), which comprises a retaining portion (303) which extends as far as a free edge (304) of the retaining ring (301) and is configured to internally engage with a locking ring (202) of a neck (201) of the container (2) in such a way as to remain anchored to the neck (201), and a closing element (302) removably engageable with the neck (201), so as to open or close the container (2); the separating line (5) extending between a first end (501) and a second end (502) and being circumferentially interrupted to leave the closing element (302) and the retaining ring (301) joined; and wherein an incision line (7) is provided on the lateral wall (3) between the separating line (5) and the free edge (304); the cap (1) additionally comprising a tab (308), configured to rest on the neck (201) when the closing element (302) is in an open condition, and a pair of movement bands (306a; 307a), that is to say, a first movement band (306a) and a second movement band (307a) which are defined between the separating line (5) and the incision line (7) and a pair of hinge bands (306b; 307b), a first hinge band (306b) and a second hinge band (307b), which extend from the first movement band (306a) and from the second movement band (307a) towards the transversal wall (4); the tab (308) being circumferentially interposed between the first hinge band (306b) and the second hinge band (307b),
  wherein the first movement band (306a) and the first hinge band (306b) define a first connecting component (306),
  wherein the second movement band (307a) and the second hinge band (307b) define a second connecting component (307), each connecting component (306; 307) being configured to connect the closing element (302) and the retaining ring (301) to each other,
  wherein each connecting component (306; 307) is "L"-shaped, and
  wherein when the cap (1) is in the closed condition, each movement band (306a; 307a) is perpendicular to the respective hinge band (306b; 307b).

2. The cap according to claim 1, wherein the tab (308) has two lateral edges (311), defined by means of a pair of inner cuts (6), that is to say, a first inner cut (601) and a second inner cut (602), and wherein each hinge band (306b; 307b) has an inner edge directed towards the tab (308) which is at least partially defined by a respective inner cut (6).

3. The cap according to claim 2, wherein the tab (308) has an end edge (309), defined by a central stretch (701) of the incision line (7) which is configured to be directed, when the cap (1) is in the open condition, towards the neck (201), or towards the supply opening (203), of the container (2), and wherein the two inner cuts (6) extend from opposite ends of the central stretch (701) towards the transversal wall (4).

4. The cap according to claim 2, wherein each inner cut (6) extends axially beyond the separating line (5).

5. The cap according to claim 2, comprising a pair of outer cuts (8), a first outer cut (801) and a second outer cut (802) which extend respectively from the first end (501) and from the second end (502) of the separating line (5) towards the transversal wall (4), wherein each hinge band (306b; 307b) has an outer edge defined by a respective outer cut (8), the outer edge of the first hinge band (306b) is defined by the first outer cut (801) and the outer edge of the second hinge band (307b) is defined by the second outer cut (802), and wherein each hinge band (306b; 307b), which extends between the respective outer edge and the respective inner edge, is circumferentially defined between an outer cut (8) and an inner cut (6) and in particular the first hinge band (306*b*) is defined between the first outer cut (801) and the first inner cut (601) and the second hinge band (307*b*) is defined between the second inner cut (602) and the second outer cut (802).

6. The cap according to claim 5, wherein the outer cuts (8) and the inner cuts (6) are parallel to each other and parallel to the axis (Z) so that, when the cap is in the closed condition, the hinge bands (306*b*; 307*b*) are shaped like strips with edges which are parallel to each other having a median line parallel to the axis (Z).

7. The cap according to claim 5, wherein the inner cuts (6) have a same first height along the axis (Z), and wherein the outer cuts (8) have a same second height along the axis (Z), the inner cuts (6) and the outer cuts (8) having respective upper ends positioned in a same plane perpendicular to the axis (Z).

8. The cap according to claim 5, wherein the inner cuts (6) and the outer cuts (8) are made by means of cutting lines which pass through an entire thickness of the lateral wall (3).

9. The cap according to claim 2, wherein the first lateral stretch (702) and the second lateral stretch (703) are aligned with each other and lie in a plane parallel to a separating plane in which the separating line (5) lies; and wherein the central stretch (701) is circumferentially interposed between the first lateral stretch (702) and the second lateral stretch (703) and lies in the same plane to form a tab (308) having an end edge (309) aligned with the movement bands (306*a*, 307*a*), wherein the incision line (7) comprises a pair of lateral stretches (702, 703) wherein a first lateral stretch (702) defines, with a first part of the separating line (5) which extends from the first end (501) of the separating line (5), the first movement band (306*a*) and a second lateral stretch (703) defines, with a second part of the separating line (5) which extends from the second end (502) of the separating line (5), the second movement band (307*a*).

10. The cap according to claim 2, wherein the first lateral stretch (702) and the second lateral stretch (703) are aligned with each other and lie in a plane parallel to a separating plane in which the separating line (5) lies; and wherein the central stretch (701) is circumferentially interposed between the first lateral stretch (702) and the second lateral stretch (703) and lies in a further plane parallel to the separating plane and parallel to the plane in which the first lateral stretch (702) and the second lateral stretch (703) lie to form a tab having an end edge which projects relative to the movement bands (306*a*; 307*a*), wherein the incision line (7) comprises a pair of lateral stretches (702, 703) wherein a first lateral stretch (702) defines, with a first part of the separating line (5) which extends from the first end (501) of the separating line (5), the first movement band (306*a*) and a second lateral stretch (703) defines, with a second part of the separating line (5) which extends from the second end (502) of the separating line (5), the second movement band (307*a*).

11. The cap according to claim 1, and comprising a pair of outer cuts (8), that is to say, a first outer cut (801) and a second outer cut (802) which extend respectively from the first end (501) and from the second end (502) of the separating line (5) towards the transversal wall (4), wherein each hinge band (306*b*; 307*b*) has an outer edge defined by a respective outer cut (8), the outer edge of the first hinge band (306*b*) is defined by the first outer cut (801) and the outer edge of the second hinge band (307*b*) is defined by the second outer cut (802).

12. The cap according to claim 1, wherein the incision line (7) comprises a pair of lateral stretches (702, 703) wherein a first lateral stretch (702) defines, with a first part of the separating line (5) which extends from the first end (501) of the separating line (5), the first movement band (306*a*) and a second lateral stretch (703) defines, with a second part of the separating line (5) which extends from the second end (502) of the separating line (5), the second movement band (307*a*).

13. The cap according to claim 1, wherein along the separating line (5) a plurality of breakable bridges (503) is provided and optionally-along the incision line (7), a plurality of breakable elements (704) is provided, those breakable bridges (503) and breakable elements (704) being intended to break the first time the cap (1) is opened.

\* \* \* \* \*